United States Patent [19]

Evich

[11] Patent Number: 4,606,094

[45] Date of Patent: Aug. 19, 1986

[54] AUTOMATIC SURFACE DRESSING MACHINE

[76] Inventor: Vincent J. Evich, 1315 S. Leland, San Pedro, Calif. 90731

[21] Appl. No.: 703,514

[22] Filed: Feb. 20, 1985

Related U.S. Application Data

[63] Continuation-in-part of Ser. No. 585,441, Mar. 2, 1984, abandoned.

[51] Int. Cl.[4] ........................ A22C 25/14; A22C 25/17
[52] U.S. Cl. ............................................ 17/50; 17/54; 17/62; 17/64; 17/51
[58] Field of Search .................... 17/54, 64, 45, 55, 62, 17/58, 67, 11.1 R, 50, 51

[56] References Cited

U.S. PATENT DOCUMENTS

| | | | |
|---|---|---|---|
| 1,230,222 | 6/1917 | Rieske | 17/11.1 R |
| 1,430,816 | 10/1922 | Kellington | 17/58 |
| 1,982,083 | 11/1934 | Strand | 17/67 |
| 3,076,997 | 2/1963 | Evich | 17/54 |
| 3,495,294 | 2/1970 | Reinke | 17/54 |
| 4,106,193 | 8/1978 | Fisher et al. | 17/67 |

Primary Examiner—Willie G. Abercrombie
Attorney, Agent, or Firm—Sellers and Brace

[57] ABSTRACT

Disclosed is an automatic apparatus for removing a surface layer of predetermined thickness from objects of varying curvilinear contour advancing past a multiplicity of floatingly supported power-driven dressing rollers positionable automatically by the changing contour of the objects. The combined width of the object being dressed and the dressing rollers are so distributed that each dresses only a separate strip. Uniformity of strip thickness is achieved, in part, by controlling the pressure of the dressing rollers against the object and, in part, by utilizing a shoe beside the dressing rollers effective to limit the thickness of the dressed layer and to tilt the axis of the rollers in either direction in response to the changing transverse contour of the object. Cuttings are removed by suction air flowing past each dressing roller. When the apparatus is used to dress fish fillets or other skin-bearing edibles, one or more surface grooving, scraping and loosening auxiliaries may be located in the path of advance and used advantageously.

50 Claims, 30 Drawing Figures

AUTOMATIC SURFACE DRESSING MACHINE

This application is a continuation-in-part of my application for U.S. Letters Patent Ser. No. 585,441 filed Mar. 2, 1984, now abandoned, entitled AUTOMATIC SURFACE DRESSING MACHINE.

This invention relates to surface dressing apparatus, and more particularly to a unique apparatus for automatically removing a surface layer from objects of varying size and curvilinear contour.

BACKGROUND OF THE INVENTION

Large quantities of fish are processed for canning and preservation in various ways, all requiring manual manipulation for the removal of entrails and waste material as well as the removal of fins, scales, skin and other waste matter. For many reasons well known to those engaged in the fish processing art, these operations have been conducted in the past primarily by hand labor. To reduce the cost and labor involved, various proposals have been made utilizing power equipment. Illustrative of these proposals are the teachings found in the U.S. Pat. Nos. 1,615,134 to Price; 2,565,727 to Henderson; 2,683,893 to Baader; 2,893,052 to Schlichting; 2,913,759 to Evich; 3,076,997 to Evich; and 3,561,044 to Evich.

In general, these various proposals have limited objectives and capabilities. For example, Price proposes a power-driven abrading roller for removing scales of a fish held in the operator's hands with the aid of tongs. Baader proposes a rotating loading table for transferring fish onto a second table operable to pass fish past slitting, trimming, and dressing devices primarily restricted to removing the opposite ends of a fish and its entrails. Schlichting is also concerned with the provision of a machine for passing fish past cutting knives each designed for performing a different operation. Evich U.S. Pat. No. 2,915,759 proposes two machines, one of which is designed to cut the throat of a fish conveyed past a rotating knife and the second performing a slitting operation lengthwise of the fish belly. Henderson discloses a fish dressing apparatus for passing predressed and quartered tuna past two independent processing stations each equipped with photoelectric controlled dressing knives, operable to remove dark meat characteristic of the tuna species. The apparatus requires manual inversion of the fish before processing by the second processing station.

The two latest Evich patents propose apparatus for advancing fish fillets past several groups of power-driven scale-removing dressing rollers. In the earlier U.S. Pat. No. 3,076,997 patent, the rollers are mounted transversely of the ends of arms restricted to pivotal movement in different radial planes extending lengthwise of the advancing fillets. These arms are equipped with sensor means controlling a pneumatic actuator for adjusting the dressing roller in a radial plane relative to the fillet. To avoid the wasteful and excess removal of flesh by this general arrangement, the last issued Evich patent proposes a more sophisticated servo adjusting mechanism for the dressing rollers. In this machine, the wide dressing rollers are mounted on arms arranged in an arc about the fillet conveyor and pivot in radial planes as well as about the axes of their respective supporting arms rather than about an axis tangent to the area of the rollers in dressing contact with the fillet as is crucially important to efficient and non-wasteful dressing. Each arm is provided with a complex pneumatic-hydraulic actuator operable to shift the arms in the radial planes in response to a fillet-engaging, rockable sensor embracing and pivoting about the axis the dressing rollers. The multiplicity of dressing rollers, each controlled by independently operable complex servo control systems of the type just mentioned involve difficult and costly maintenance and operating problems and has been found inadequate to avoid the removal of excess fillet flesh.

SUMMARY OF THE INVENTION

The present invention is the culmination of more than twenty five years of effort to overcome the serious problems attending attempts to dress a layer of predetermined thickness from an object, such as fish, having texture, flexibility, pliancy and flabbiness and varying in size and shape. Automatic apparatus for accomplishing these objectives in a most efficient, non-wasteful and satisfactory manner is provided by this invention. The fish fillets or other objects to be dressed are conveyed past a dressing station equipped with a multiplicity of relatively narrow, small diameter dressing rollers and distributed along the path of advance and each arranged to dress a separate strip of uniform thickness from the fillets whereby the entire surface has been dressed away when the fillet has passed the last roller. Each dressing roller is biased into predetermined pressure contact with the fillet. The depth of the dressed layer is controlled by shoe means positioned closely beside the roller ends and operable to pivot the roller about an axis tangent to the rollers' line of contact with the fillet. This novel expedient avoids the removal of excess material and insures that a layer of uniform thickness will be removed. The dressing rollers are mounted on individual supporting arms counterweighted to pivot away from the fillet in its own vertical plane extending lengthwise of the conveyor. A separate manually adjustable counterweight is provided to pivot each roller supporting arm to a preselected neutral position wherein the plane of the associated dressing roller lies normal to an area being dressed.

Important auxiliaries include suction air and fluid moistening means associated with each dressing roller to convey cuttings away therefrom and one or more auxiliaries upstream from the dressing station to prepare the fillet surface for more efficient removal by the dressing rollers and to loosen, if not remove fins and bony structures associated with the fins as the fillets approach the dressing station.

Accordingly, it is a primary object of this invention to provide an improved method and apparatus for automatically removing a layer of predetermined thickness from objects of varying size and contour.

Another object of the invention is the provision of improved method and apparatus for automatically processing fish fillets to remove fins and a layer of predetermined thickness therefrom.

Another object of the invention is the provision of a novel power-driven, floatingly supported dressing roller having separate, manually adjustable means for biasing the roller into uniform contact with an object to be dressed thereby to remove a layer of predetermined thickness therefrom.

Another object of the invention is the provision of automatic surface-dressing apparatus having conveyor means for advancing an object to be dressed past a dressing station equipped with groups of floatingly supported dressing rollers and spaced apart lengthwise of the dressing station, each group including independent, power driven dressing rollers, each positioned to dress a different strip of predetermined, uniform thickness controlled by a surface-contracting shoe located to either side of each dressing roller.

Another object of the invention is the provision of automatic apparatus for dressing fish fillets of differing size and contour, utilizing a multiplicity of dressing rollers each independently supported by individually adjustable counterweight means operable to bias each dressing roller in a direction to dress a strip of uniform thickness from an object of varying curvilinear contour undergoing dressing.

Another object of the invention is the provision of a method and apparatus for dressing a surface layer of predetermined thickness from a fish fillet and removing the fluid moistened cuttings in a suction air stream.

Another object of the invention is the provision of an apparatus and method for dressing the scales, fins and skins from fish fillets, utilizing surface loosening and grooving auxiliaries upstream from power-driven surface dressing means.

These and other more specific objects will appear upon reading the following specification and claims and upon considering in connection therewith the attached drawing to which they relate.

Referring now to the drawing in which a preferred embodiment of the invention is illustrated.

GENERAL DESCRIPTION

Figure 1A:
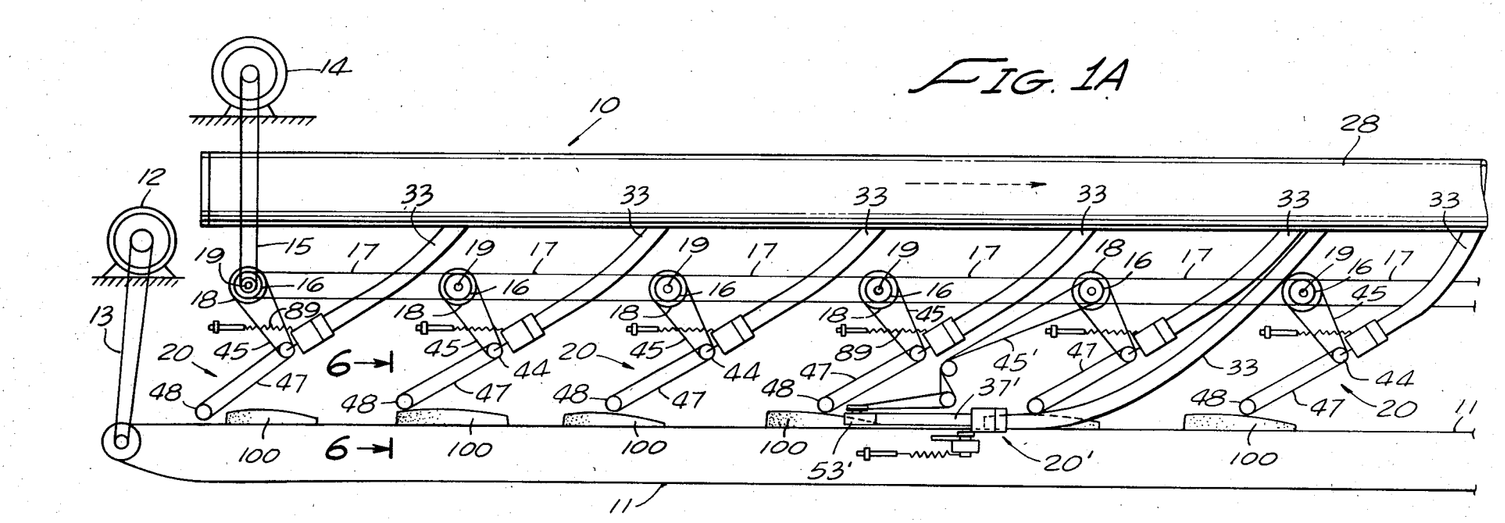
FIGS. 1A and 1B are diagrammatic side elevational views respectively of the leading and trailing halves of a fish dressing apparatus embodying the features of this invention.
Figure 1B:
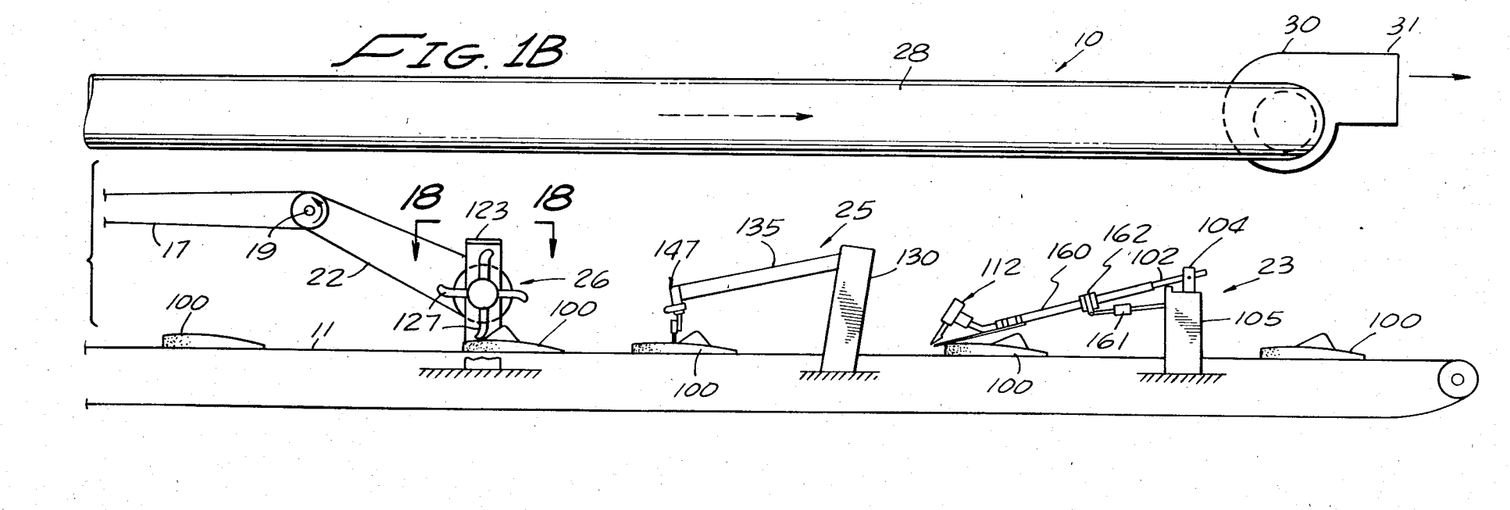

Apparatus for practising the principles of this invention and arranged with auxiliaries suitable for dressing the skin, scales and fins from fish fillet, designated generally 10, is illustrated in FIGS. 1A and 1B. The apparatus has a conveyor 11 driven by a variable speed motor 12 and a belt 13. The apparatus includes a suitable main frame, not shown, but understood as providing a support for all components, including a set speed motor 14 having a main drive belt 15 connected to a pulley 16 supplying power to a plurality of belts 17 and a plurality of pulleys 18 connected in series lengthwise of conveyor 11. The pulleys 18 are mounted on shafts 19 extending crosswise of conveyor 11. As herein shown, each of the shafts 19 is provided with a pair of pulleys supporting a pair of belts 17. Shafts 19 also support separate drive pulleys 18 for a drive belt 45 for the floatingly supported surface dressing mechanisms designated generally 20 in FIG. 1A. The details of mechanisms 20 are shown in FIGS. 2 to 5 and elsewhere. The drive belt 17 shown at the righthand end of FIG. 1A and at the lefthand end of FIG. 1B is connected by a belt 22 to a dressing accessory designated generally 26. Further upstream of conveyor 11 as shown in FIG. 1B are two additional belt-driven dressing accessories, including a surface loosening and scratching accessory 25 and a surface grooving and scraping accessory 23, each mounted on brackets straddling the conveyor and attached to the main frame.

Another major component of the dressing apparatus comprises a suction manifold 28 suitably supported from the main frame and extending lengthwise of the main dressing station shown in FIG. 1A. Manifold 28 opens into the inlet of a power-driven suction fan 30 having an outlet 31 discharging the material dressed from the fish or other object to a point of disposal. Manifold 28 is connected by separate lengths of flexible tubing 33 to the rear ends of each dressing mechanism 20 each of which is provided with a tubular duct, to be described presently, opening into a shroud embracing the surface dressing roller of the dressing mechanisms 20. Accordingly, all scales, skin and other cuttings removed by the dressing rollers are carried away in the strong, suction air stream flowing in the suction manifold 28.

Fluid moistening of the cuttings flowing through the dressing mechanisms 20 provided by a spray of fluid introduced from a pressurized fluid supply pipe 29 is found to expedite the flow of the cuttings and to avoid adherence of these to parts of the suction passage.

THE FLOATING DRESSING MECHANISMS

The multiplicity of floating dressing mechanisms 20 are distributed crosswise and lengthwise of the forward end of the conveyor 11 shown in FIG. 1A. The structural and operating details of these mechanisms are shown in FIGS. 2 through 13 and 25 to 27, wherein there are a total of twenty independently mounted and driven mechanisms, each having its own dressing roller, independently adjustable counterweight and biasing components and its own flexible suction hose connection 33 discharging into the suction manifold 28. Mechanisms 20 are arranged in five groups of three mechanisms and at least one group of five mechanisms, with the dressing rollers and their supporting arms being supported on a horizontal axis extending transversely of the conveyor. The single dressing roller supported by each mechanism 20 dresses a relatively narrow strip from the object being dressed, such as a fish fillet, it being understood that the combined width of the eighteen dressing rollers represents the maximum width of a fillet dressable by apparatus 10. Most fillets will of course be of substantially less width than the maximum size, in which event the dressing rollers positioned laterally outside the fillet will be inactive and with the dressing roller positioned in a rest position closely spaced to the conveyor surface as shown by way of example at the foremost end of FIG. 1A.

Each dressing mechanism is positioned to remove only a designated narrow strip of the whole width of the fillet. Most of the dressing mechanisms are restricted to a pivotal movement in a vertical plane longitudinally of the conveyor, whereas the dressing roller itself is free to pivot in a limited arc about an axis tangent to the rollers' line of contact with the object being dressed. By this technique, all rollers including the outermost one, can pivot to dress a strip of uniform thickness from the contiguous area of the fillet including the lateral edge of a fillet lying at an obtuse angle to the conveyor. This is true even though all except the outermost dressing mechanisms as a whole are restricted to pivot in a vertical plane.

Figure 2:
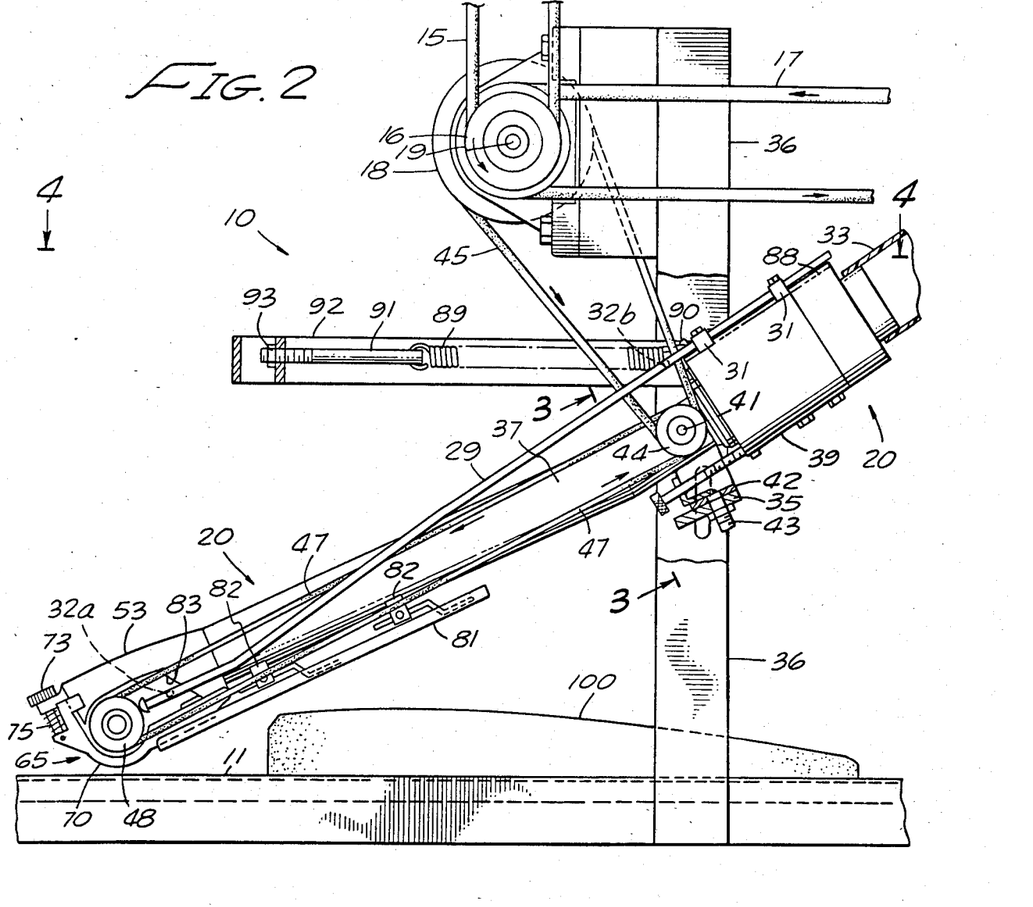
FIG. 2 is the side elevational view taken along line 2—2 on FIG. 4 and showing one of the surface dressing mechanisms in its normal inactive position of rest.
Figure 3:
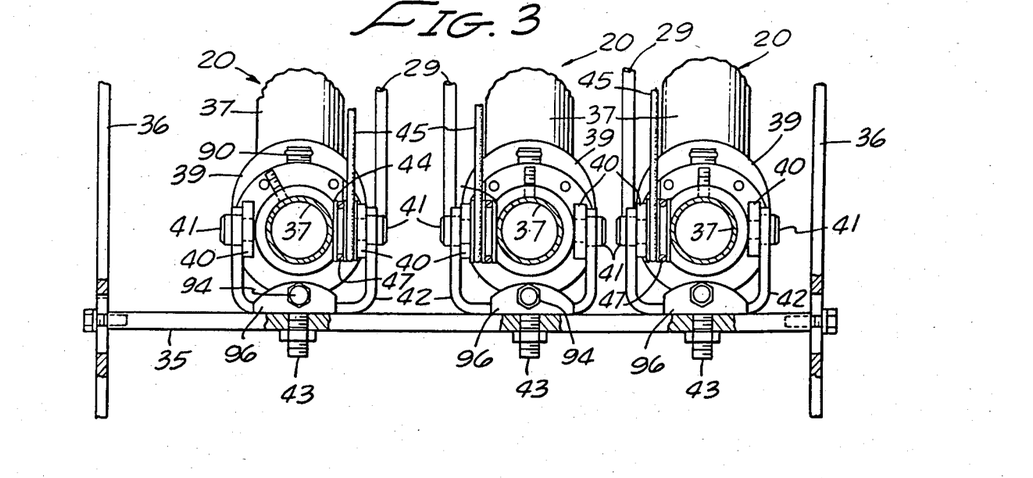
FIG. 3 is a fragmentary cross-sectional view on an enlarged scale taken along lines 3—3 on FIG. 2 showing details of the horizontal pivotal support for one transverse group of the dressing mechanisms.
Figure 4:
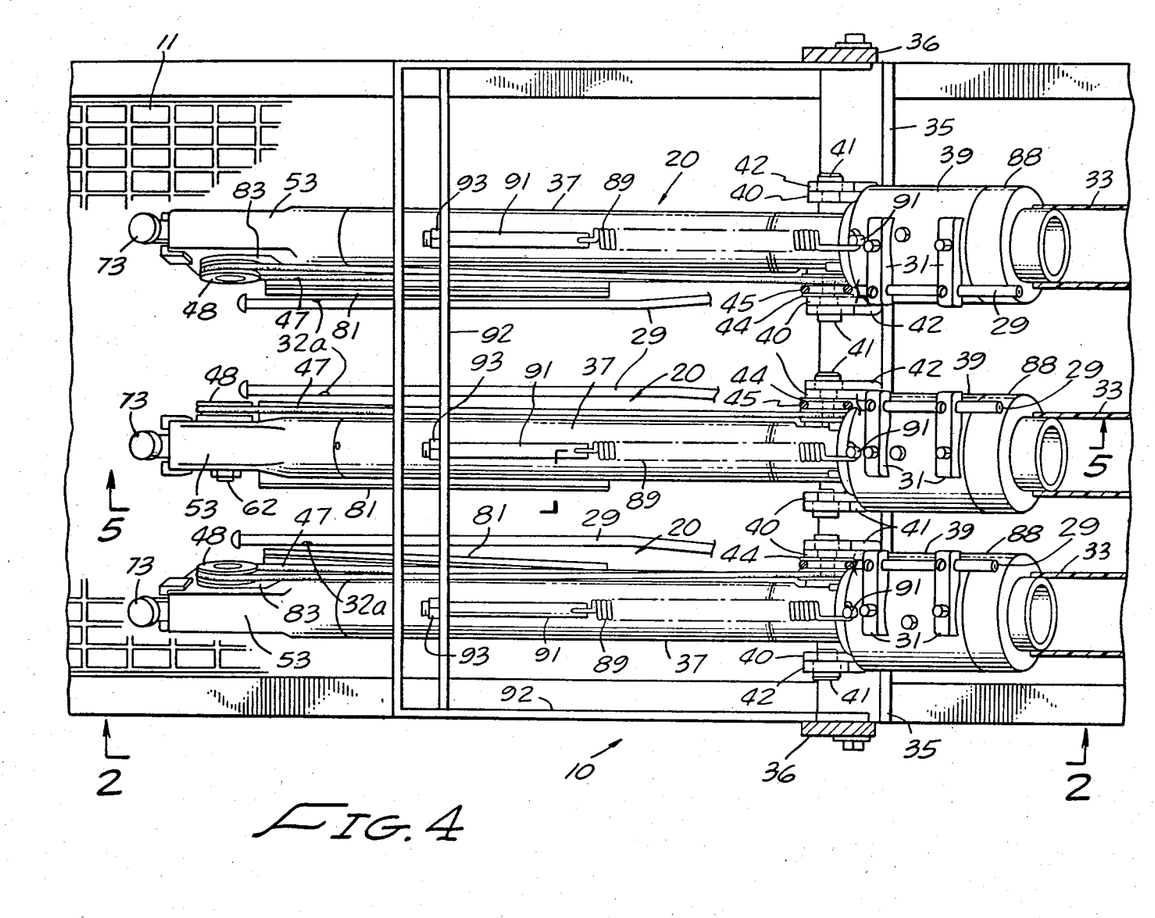
FIG. 4 is a cross sectional view taken along line 4—4 on FIG. 2 showing one transverse group of the dressing mechanisms.

The structural components satisfying the aforementioned criteria will now be described with particular reference to FIGS. 2 through 7. FIGS. 2, 3 and 4 show three dressing mechanisms 20 supported on a shelf 35 extending horizontally crosswise of the conveyor with its ends anchored to the main frame by upright brackets 36. The main body of each dressing mechanism has a long tubular arm 37, the righthand or rear end of which is embraced by a pair of anti-friction bearings 38 (FIG. 5) mounted in a housing 39. Projecting forwardly from the front end wall of housing 39 are a pair of lugs 40, 40 provided with aligned openings journalled on the inner ends of shouldered screws 41 (FIG. 3) mounted in the legs of a U-shaped bracket 42 rigidly clamped to shelf 35 by a nut and bolt 43. One of the pivot screws 41 for each of the dressing mechanisms is longer than the other and supports a pulley 44 having a pair of grooves, one of which supports a belt 45 driven by an associated one of the pulleys 18 of the main power supply shown in FIG. 1A. The other groove of each of the pulleys 44 seats a belt 47 extending along the side of each of the dressing mechanisms 20 and driving a pulley 48 integral with a respective dressing roller 50 of that mechanism, as clearly appears from FIG. 10. The major portion of dressing rollers 50 is enclosed within a hollow shroud 53 telescoped over the forward end of arm 37. These rollers are supported on non-corrosive anti-friction bearings 54, such as nylon balls 55. These bearings are held assembled by a split ring keeper 58 against a collar 56 adjacent one end of a shaft 57. This shaft is provided with a smaller flange 59 closely beside the righthand end of flange 56, this smaller flange 59 being provided with a pair of flats 60 fitting against the sides of a slot 61 (FIG. 5) opening through the righthand side wall of shroud 53. These flats prevent the shaft 57 from rotating while it is being clamped to shroud 53 by the clamping nut 62 threaded onto its outer end. This single clamping nut serves to hold the shaft and the dressing roller 50 firmly but detachably clamped within the shroud.

CUTTINGS FLUSHING DEVICE

Figure 5:
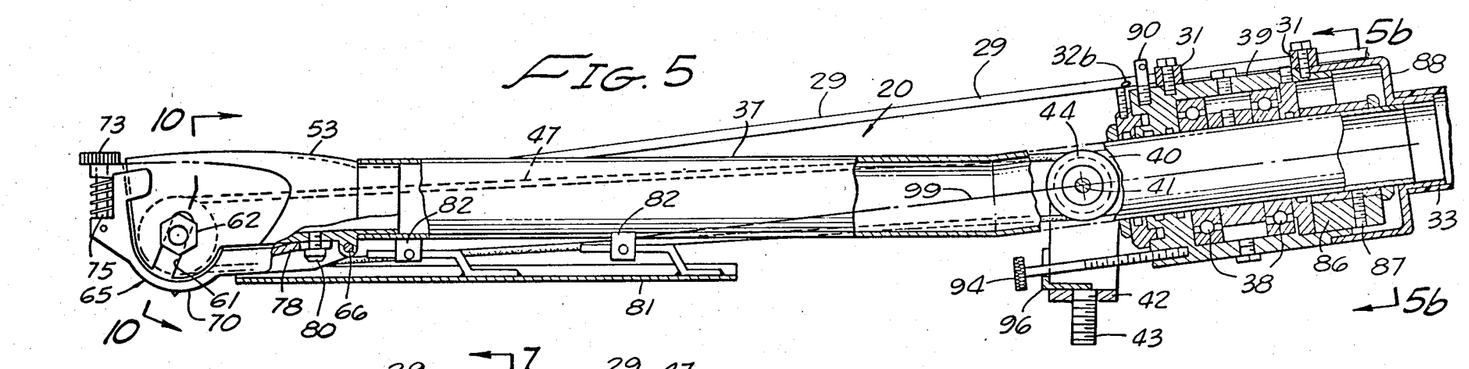
FIG. 5 is a cross sectional view taken along the broken line 5—5 on FIG. 4 showing structural details of one of the dressing mechanisms.

When the removed cuttings are moist or sticky as they often are when dressed from fillets or the like, they tend to collect on interior surfaces of the dressing mechanisms and present operational and sanitation problems. These are resolved in a fully satisfactory manner by spraying a fluid such as water from spray ports located in the pressurized fluid supply pipe 29 extending along the exterior of each tubular arm 37 and anchored to housing 39 by brackets 31. Each pipe is preferably equipped with spray ports 32a and 32b. Both of these ports are located in the sidewall of the pipe, port 32a being adjacent the forward end of the pipe and disposed to spray fluid into opening 83 of shroud 53 (FIGS. 4–6) and opening 32b being disposed to spray fluid onto the rotary fittings at the forward end of housing 39 for the tubular arm 37 (FIG. 5). Adjacent portions of arm 37 includes ports, now shown, permitting small quantities of the spray and air to enter arm 37 and aid in preventing the deposit of cuttings in these areas. Pipe 29 may be formed of stainless steel and is suitably supported in brackets 31 and positioned for the most effective delivery of the spray into the air entering opening 83, onto dressing roller 50 and into the contiguous interior areas of shroud 53 to flush away and prevent the deposit of cuttings. Port 32b functions similarly to avoid the collection of cuttings in the area adjacent the rear portion of tubular arm 37.

THE DRESSING DEPTH CONTROL FACILITY

Figures 5A, 9:
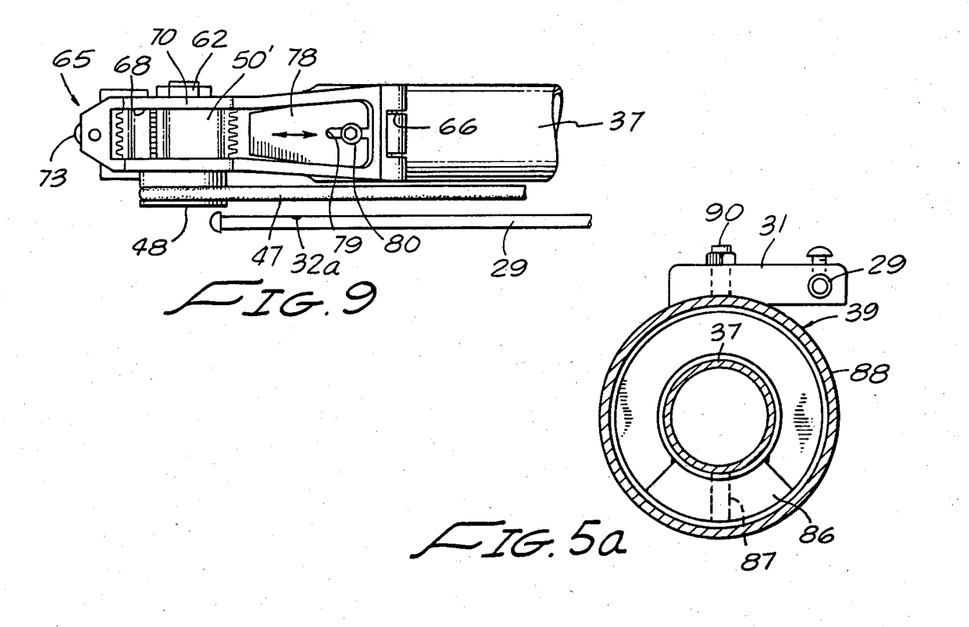
FIG. 5a is a cross sectional view taken along line 5b on FIG. 5.
FIG. 9 is a fragmentary view taken along line 9—9 on FIG. 7.
Figure 7:
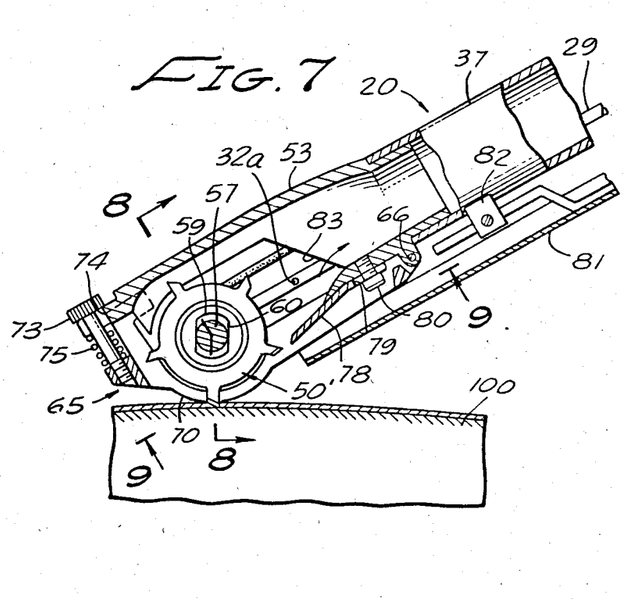
FIG. 7 is a fragmentary sectional view taken along line 7—7 on FIG. 6.

The depth of the dressing cut made by dressing rollers 50 is controlled by a shoe, designated generally 65, underlying the shroud 53 and best shown in FIGS. 2, 5 and 9. As there shown, shoe 65 is pivotally supported by a pivot pin 66 (FIG. 7). Shoe 65 has a long, generally rectangular opening 68 (FIG. 9) sufficiently wide as to closely embrace the opposite sides of the dressing roller 50. The lower, semi-cylindrical surfaces 70 are spaced radially inwardly of the periphery of the dressing rollers by the thickness of the layer to be dressed from the fillet or other object undergoing dressing. The thickness of this layer is controlled by adjusting a thumb nut 73 having its shank threaded into the forward end of shoe 65, the upper end of this shank being loosely accommodated in a notch 74 (FIG. 7) in shroud 53. A compression spring 75 surrounding the shank of the thumb nut 73 urges the shoe to pivot counterclockwise about its pivot pin 66 as is evident from FIG. 7. It will be understood that tightening the screw 73 increases the thickness of the cut made by the dressing roller, whereas loosening it diminishes the thickness of the cut.

Referring to FIGS. 7 and 9, there is shown an adjustable plate 78 for restricting the flow of suction air into the underside of shroud 53 and having a slot 79 at its rear end to accommodate a thumb nut 80 mounted in a threaded bore on the underside of shroud 53. Loosening of this thumb nut enables the operator to adjust the plate 78, relative to the periphery of the dressing roller 50 so as to constrict or regulate the suction air stream entering the tubular arm 37 most effectively to entrain cuttings produced by the dressing roller. Another major portion of the suction air stream enters shroud 53 through an opening 83 (FIG. 7) located along the side walls of shroud 53. As herein shown, opening 83 is located only in the side wall closest to pulley 48, the other side wall being closed and provided with a mounting slot 61 accommodating the shaft of the dressing roller and permitting the roller to be quickly detached when nut 62 is loosened.

As is best shown in FIGS. 2, 5 and 7, each mechanism 20 is provided with a sensing shoe 81 in the form of a long resilient blade underlying the associated tubular arm 37. Shoe 81 is adjustably supported on arm 37 by set screws and brackets 82. The forward end of sensing shoe 81 has gently upwardly curved lateral edges. As a fillet 100 approaches one of the dressing mechanisms, mechanism 20 and sensing shoe 81 occupy an inactive rest position close to the conveyor as is shown in FIG. 2. Further forward movement brings the forward end of the fillet into contact with sensor 81 thereby pivoting the dressing mechanism clockwise sufficiently to position the dressing roller 50 or 50' at the appropriate elevation and properly oriented about the pivot axis 99 (FIG. 5) to lie in a plane normal to the underlying fillet surface. Thereafter, shoe 81 remains in light pressure contact with the fillet and effective to pivot the dressing mechanism about axis 99 if necessary to maintain roller 50 normal to any change in the contour of the fillet.

DRESSING MECHANISM COUNTER-BALANCE AND BIASING MEANS

Referring to FIGS. 2 and 5, there will be described details of the biasing and counter-balance means for each of the dressing mechanisms 20. As was pointed out in the General Description of this invention, the rear or righthand end of these mechanisms, as shown in FIG. 5, is supported for limited pivotal movement about their own axis in a pair of bearings 38 enclosed by housing 39. Embraced by housings 39 and 88 is eccentric counterweight 86 encircling the rear end of arm 37 and clampable in a desired oriented position thereon by a set screw 87 (FIG. 5 and 5b). Access to this counterweight and to said screw 87 is obtained by removing the cup-shaped cap 88 having a snug friction fit over the rear end of housing 39.

The weight of the components in housing 39, rearward of the pivot, including 86, is in excess of the weight of the components forwardly of the pivot provided by shouldered screws 41. Counteracting this counterclockwise pivotal movement is an adjustable tension spring 89 (FIG. 2) having its rear end engaged over a pin 90 secured to the forward end of housing 39 and having its forward end supported by an eyebolt 91. The latter is adjustably supported in a horizontal U-shaped bracket 92 rigidly secured to the upright bracket 36. The thumbnut 93 on eyebolt 91 is adjustable to vary the effective tension of spring 89 and bias the dressing mechanism to pivot counterclockwise into contact with the object being dressed under a desired operating pressure.

Normally, and when the dressing mechanism is not in contact with an object, spring 89 pivots the dressing mechanisms 20 to a rest position with the dressing roller just clear of conveyor 11 as shown in FIG. 2. This rest position is determined by a thumb screw 94 (FIG. 5) seated in a threaded bore of housing 39 and having its forward end passing loosely through a bifurcated bracket 96 secured to bracket 42.

The sector-shaped counterweight 86 in the rear end of housing 39 tends to pivot the tubular arm 37 and the dressing roller about the axis of bearings 38 to a desired preselected neutral positioned determined by the adjusted position of the counterweight circumferentially of tube 37.

Figure 6:
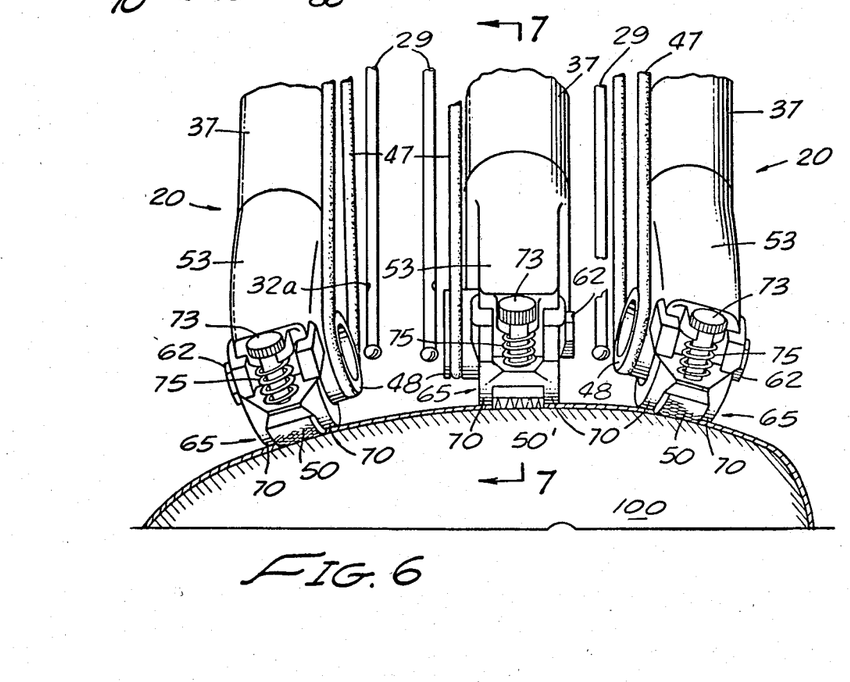
FIG. 6 is a cross sectional view on an enlarged scale taken along line 6—6 on FIG. 1A showing a group of the dressing rollers in their respective dressing positions on a fillet.

For example, referring to FIG. 6 showing one group of three dressing rollers in contact with a fish fillet, it will be noted that the lefthand roller 50 lies in a plane normal to the underlying surface of the fillet and inclined to the left from a vertical plane, whereas the righthand-most dressing roller 50 lies in a plane likewise normal to the underlying surface of the fillet but inclined in the opposite direction from a vertical plane. The center dressing roller 50', however, lies substantially in a vertical plane since the underlying area of the fillet is substantially horizontal. It will therefore be apparent that adjustment of the counterweight 86 can be accomplished by removing cap 88, loosening the set screw 87 and shifting the second-shaped counterweight 86 about the axis of the rear end of this tube to a position effective to rotate tube 37 and the associate dressing roller to a desired null position with the roller lying normal to the area of a fillet to be dressed thereby.

Figures 25, 26, 27:
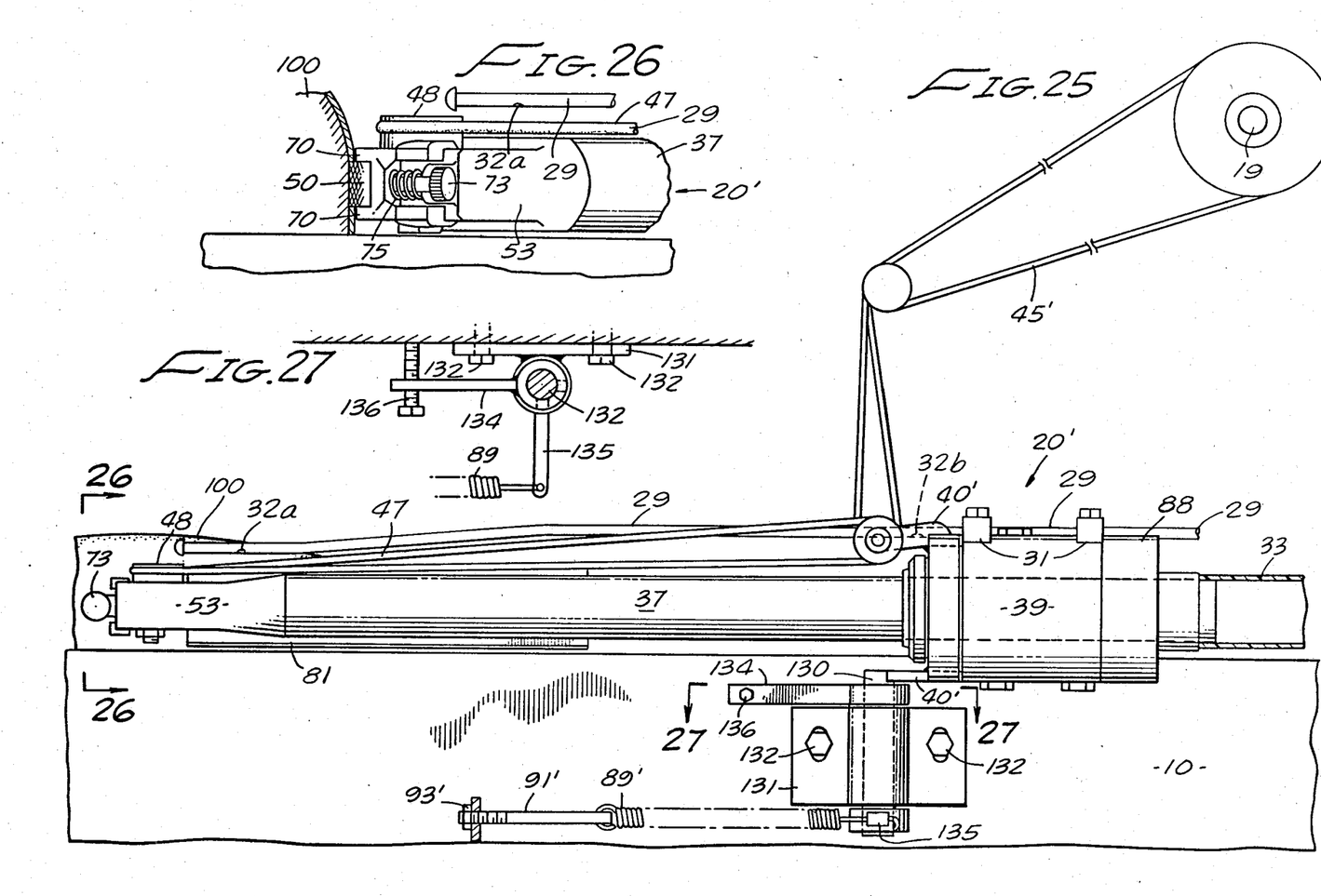
FIG. 25 is a side elevational view on an enlarged scale taken along the midlength of FIG. 1A showing details of one dressing mechanism positioned to dress a generally upright area of a fillet or the like object.
FIG. 26 is a front end view on an enlarged scale taken along line 26—26 on FIG. 25.
FIG. 27 is a cross sectional view taken along line 27—27 on FIG. 25.

The surface dressing apparatus of this invention preferably includes at least one pair of dressing mechanisms disposed on to either lateral side of the fillet or other object being dressed and differing from dressing mechanisms 20 only in minor respects which will now be described by reference to FIGS. 1A and 25 through 27. Mechanisms 20' are pivotally supported on the main frame for the dressing apparatus along either lateral side of the path of travel of the fillets and pivot generally about a vertical axis rather than about a horizontal axis as do the dressing mechanisms 20 described above. As is best shown in FIGS. 25 and 27, the bearing housing 39 at the rear end of mechanisms 20 and 20' includes a mounting ring 98' having brackets 40' extending forwardly from diametrically opposed sides as is clearly shown in FIG. 25. The upper one of brackets 40' supports pulleys for drive belts 45', 47 and the other bracket 40' is welded to a shaft 130 which is journalled in a pillow block 131 anchored to the main frame of the apparatus by cap screws 132. As is best shown in FIG. 27, a pair of arms 134 and 135 are welded to the opposite ends of shaft 130. Arm 134 extends generally lengthwise along the side of the apparatus main frame and is provided with an adjustable stop screw 136 at its outer end which bears against the main frame to limit the clockwise movement of dressing mechanism 20' toward the fillet. The other arm 135 projects outwardly away from the sidewall of the frame and supports an adjustable tension spring 89' having its lefthand end as viewed in FIG. 27 anchored to the apparatus frame and adjustable to vary the pressure of the dressing roller 50 (FIG. 26) against the fillet.

It will be understood that housing 39 encloses an adjustable counterweight 86 adjusted to a position biasing the dressing roller 50 to a neutral position against the generally vertical side of a fillet.

AUXILIARIES

Auxiliaries found useful in facilitating and expediting the operation of the dressing mechanisms 20 will now be described with reference to FIGS. 1B and 13 to 23, and which auxiliaries are found particularly useful in removing the outer layer of a fish fillet. The fin remover auxiliary 26 has the features displayed in FIGS. 18 and 19; the surface loosening auxiliary 25 having the structural features illustrated in FIGS. 13 through 17; and the surface grooving auxiliary 26 having the features illustrated in FIGS. 20 through 24. When the surface dressing apparatus 10 is employed to dress fish fillet, the rear end of conveyor 11 is preferably but not necessarily equipped with each of the auxiliaries 23, 25 and 26, but some or all of these auxiliaries may be dispensed with at the user's option when dressing other objects or even when dressing certain species of fish.

SURFACE GROOVE AUXILIARY

Figure 20:
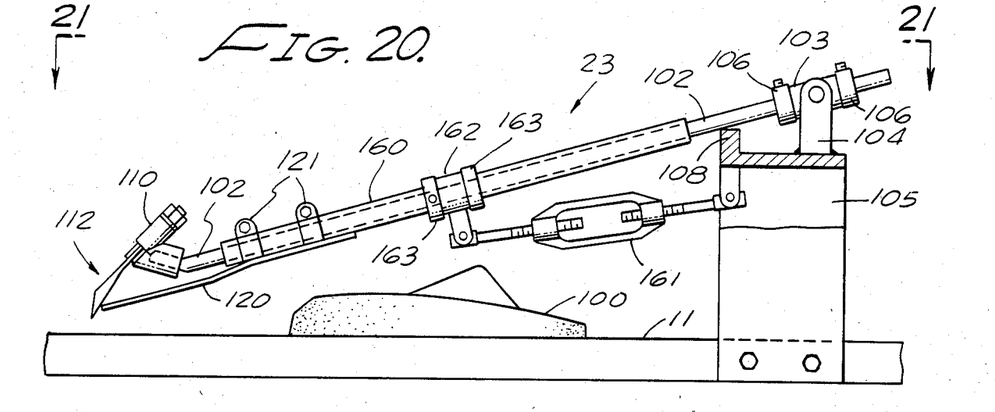
FIG. 20 is a fragmentary cross sectional view on an enlarged scale showing structural details of the skin scratching and loosening auxiliary shown in FIG. 1B.
Figure 21:
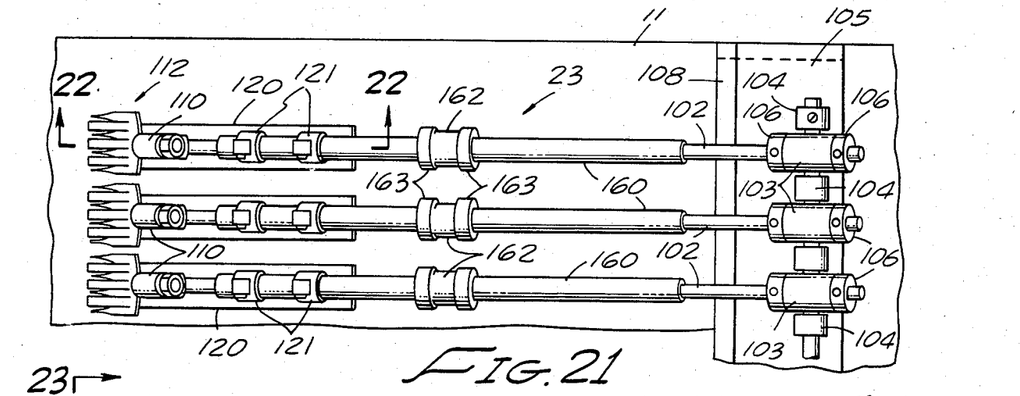
FIG. 21 is a top plan view taken along line 21—21 on FIG. 20.

Fish fillet 100 placed on the rear end of conveyor 11 advance first past the surface groover auxiliary 23 as shown in FIGS. 20 to 24. As shown, this auxiliary includes a multiplicity of elongated circular rods 102, 102 the rear ends of which pass loosely through bores in trunions 103 each having a pair of aligned trunion pins pivotally supported in brackets 104 mounted in an upright position in an inverted U-shaped bracket 105 secured to the main frame of apparatus 10. Rods 102 are free to rotate about their own axis in trunions 103 and are held loosely assembled thereto by a pair of collars 106. The upturned, forward edge 108 of the bight portion of bracket 105 underlies rods 102 and acts as a stop to limit the downward pivotal movement to a rest position in which the foremost end of each auxiliary 23 is located slightly above the conveyor 11 as indicated in FIG. 20.

The midlength of rods 102 is slidably journalled in a tube 160 (FIG. 20) connected to bracket 105 by an adjustable linkage including a turnbuckle 161. One end of this turnbuckle is pivoted to a lug fixed to bracket 105 and the other end is pivoted to a sleeve 162 embracing tube 160 and restrained from movement therealong by set screw equipped collars 163.

Figures 22, 23, 24:
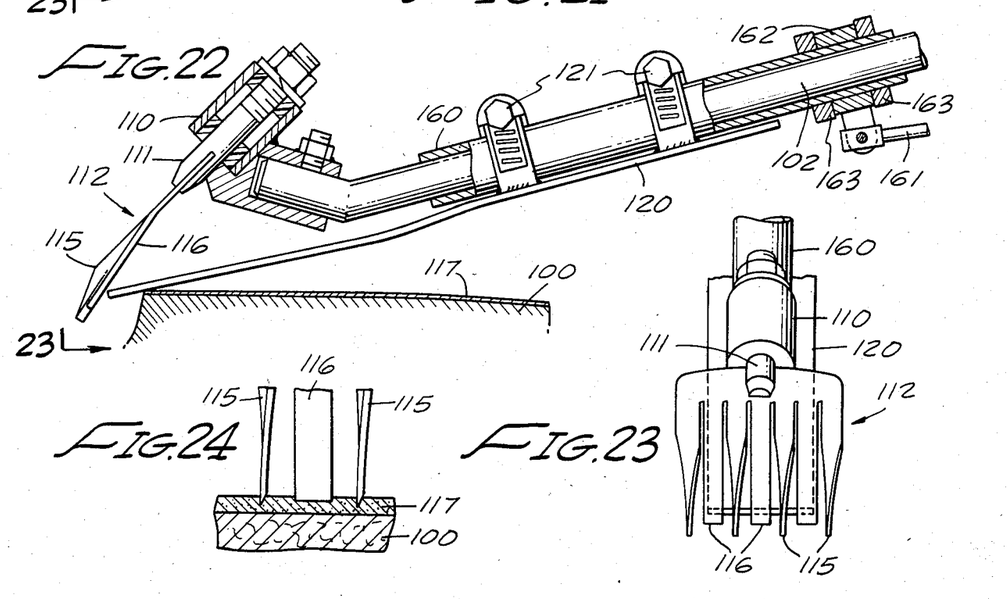
FIG. 22 is a cross sectional view on an enlarged scale taken along line 22—22 on FIG. 21.
FIG. 23 is a fragmentary end elevational view taken along line 23—23 on FIG. 22.
FIG. 24 is a fragmentary end elevational view of the skin scratching and loosening auxiliary in the process of scratching the skin of a fillet.

Suitably secured to the forward end of rods 102 is a tubular bearing 110 (FIG. 22) loosely and pivotally supporting the shank 111 in which is rigidly secured a surface grooving device 112 formed of strip spring steel or the like. Device 112 has a plurality of sharp-edged and pointed grooving fingers 115 each spaced to either side of resilient strip spring scraping blades 116. The operating relationship between the sharp cutting tips of the blades 115 and scrapers 116 is best shown in FIGS. 22 and 24. The sharp points of the grooving blades 115 are effective to form grooves in the skin 117 of a fillet 100, whereas the straight transverse free ends of scrapers 116 bear firmly against the skin between adjacent grooves and are effective to loosen if not remove some or all of the skin as the fillet advances therepast. The grooving device is elevated from its normal position of rest shown in FIG. 20 into a proper operating position by a resilient shoe 120 secured to the forward end of arms 102 by clamps 121. As will be noted, shoe 120 is in contact with the foremost end of a fillet 100 in FIG. 22 with the result that fingers 115 and blades 116 are in approximate position to groove the skin 117 of the fillet as it advances a short distance forward of the position shown. Although not shown, it will be understood that each of the arms 102 can include counterweights or spring means for pivoting them clockwise about their respective trunion axes to render them more effective in grooving and scraping the fillet skin. Additionally, it will be understood that the tubular portions of arms 102 are free to pivot about their longitudinal axes so that each of the skin grooving elements 115 and scrapers 116 will be equally effective on the underlying surface of the fillet advancing therepast.

FIN REMOVING AUXILIARY

Figure 18:
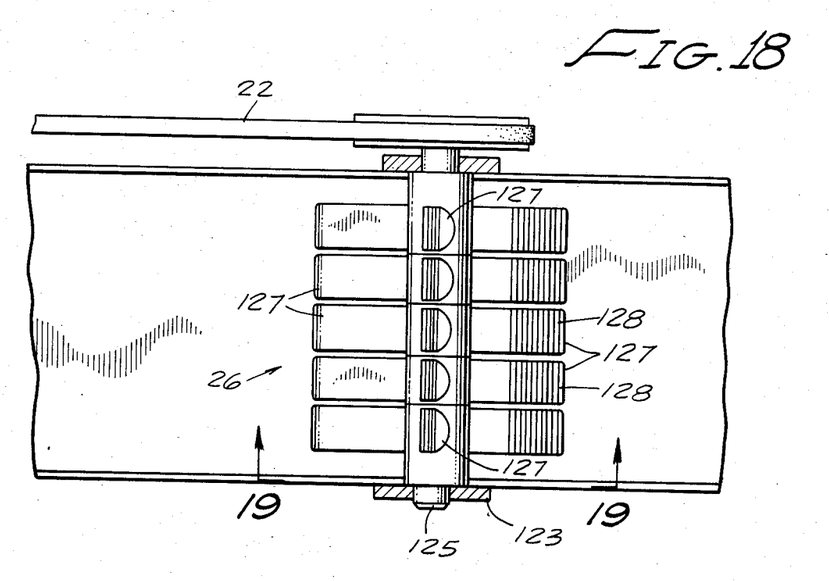
FIG. 18 is a fragmentary view on an enlarged scale taken along line 18—18 on FIG. 1B.
Figure 19:
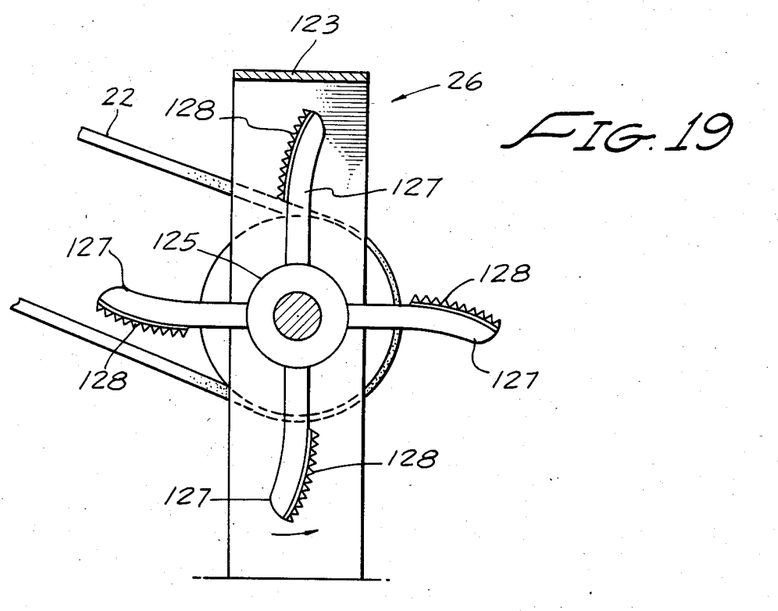
FIG. 19 is a cross sectional view taken along line 19—19 on FIG. 18 showing a fin and scale loosening and removing mechanism shown in FIG. 1B.

FIGS. 18 and 19 show details of the fin loosening auxiliary designated generally 26 supported crosswise of a conveyor 11 on an inverted U-shaped bracket 123. Journalled in the legs of this bracket is a shaft 125 driven counterclockwise by a belt 22 and motor 14 (FIG. 1A). Clamped to shaft 25 are a plurality of resilient fingers 127 having transversely serrated outer ends 128. These fingers are highly effective in detaching the remaining portions of loose skin and or fins and bony parts protruding from the fillets. When the apparatus is not used to dress fillet, auxiliary 26 may be detached or deactivated.

SURFACE LOOSENING AUXILIARY

FIGS. 13 through 17 show details of the surface loosening auxiliary 25 mounted transversely of the rear end of conveyor 11 between auxiliaries 23 and 26 as is best shown in FIG. 1B. Upright brackets 130 have their lower ends pivotally secured to the apparatus' main frame by pivot cap screws 131. The thumb nut 132 on the outer end of a threaded stud secured to the main frame and extending through slot 133 of brackets 130 (FIG. 13) permit brackets 130 to be adjusted through short forward or rearward arcs about cap screws 131. The rear ends of a plurality of arms 135 are pivotally supported on a shaft 136 mounted between the upper ends of brackets 130. A second shaft 138 underlies each of the arms forwardly of shaft 136 and acts as a stop to limit counterclockwise pivotal movement of the arms 135 about shaft 136. Secured to the side of each of arms 135 is a lug 140 having a threaded bore supporting an adjustable cap screw 142 positioned to bear against the underlying shaft 138. The adjustable stop provided by cap screw 142 limits the downward pivotal movements of the arms 135 to a position just clear of conveyor 11, when no object is undergoing dressing it is positioned beneath the forward ends of the arms 135.

Figure 13:
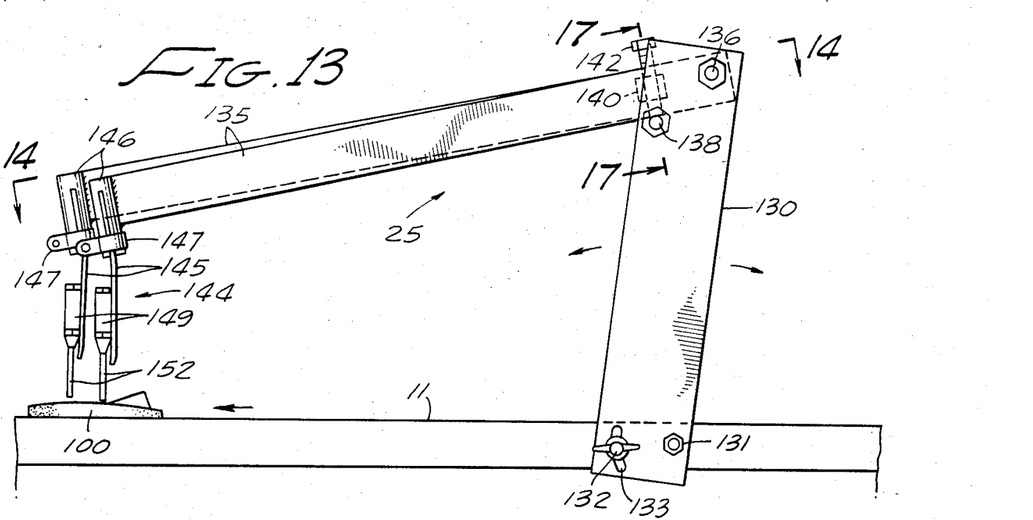
FIG. 13 is a side elevational view taken on FIG. 1B showing an auxiliary useful in loosening fins from fish fillets.
Figures 14, 15, 16, 17:
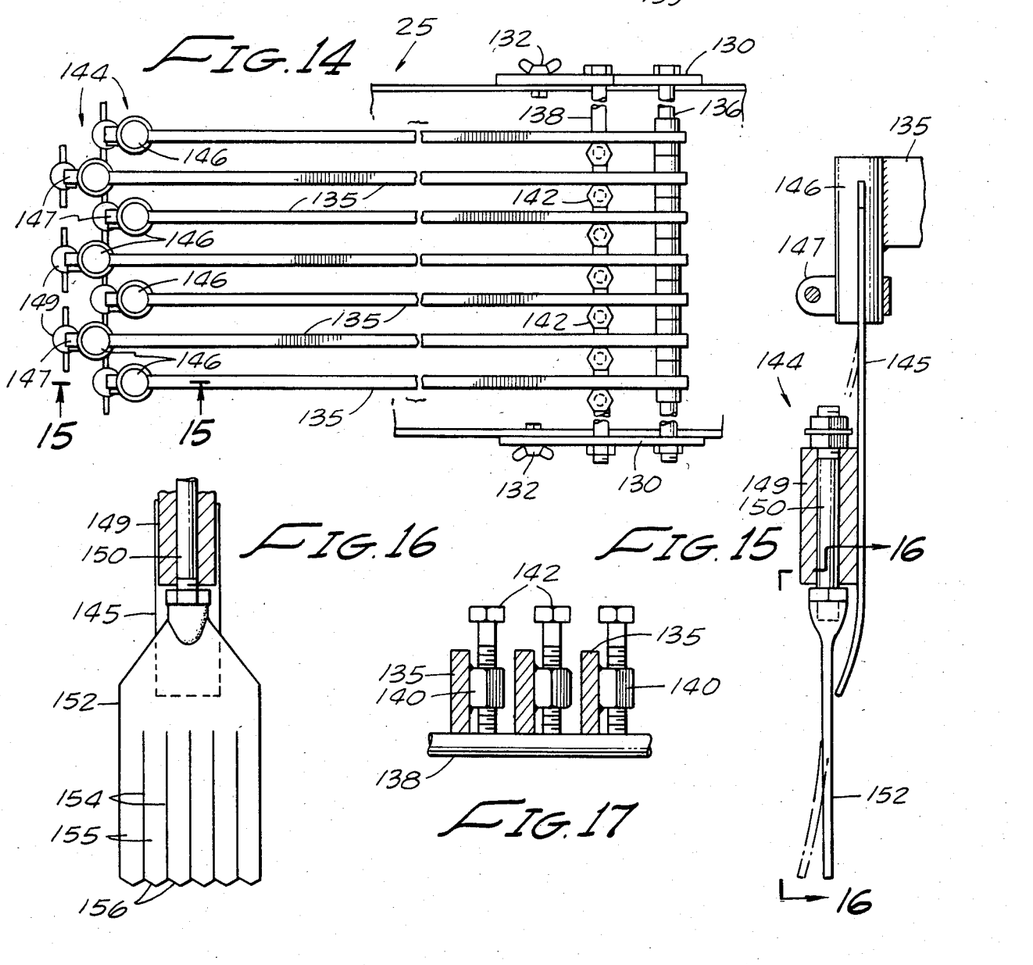
FIG. 14 is a top plan view taken along line 14—14 on FIG. 13.
FIG. 15 is a cross sectional view taken along line 15—15 on FIG. 14.
FIG. 16 is a cross sectional view on an enlarged scale taken along the broken line 16—16 on FIG. 15.
FIG. 17 is a fragmentary cross sectional view taken along the line 17—17 on FIG. 13 of the skin scratching and loosening mechanism shown in FIG. 1B.

The left hand or forward ends of arms 135, as viewed in FIGS. 13 and 14, each support a surface loosening device, designated generally 144, comprising a resilient spring blade 145 having its upper end extending into a slotted support 146 and held adjustably lengthwise of this slot by a clamp 147. Welded onto one face of spring 145 is a lug 149 rotatably supporting the shank 150 (FIG. 15). Secured to the lower end of shank 150 is a wide resilient spring strip as shown in FIG. 15. The lower end of spring 145 extends below and is curved forwardly to a position closely spaced behind the fillet scraping spring 152. Since spring 152 is normally spaced from the lower end of spring 145, it is free to rotate in a limited arc about the axis of shank 150 before engaging one or the other lower corner of spring 145. Spring 152 may comprise a single spring but preferably is quite wide transversely of the conveyor and its lower portion is provided with a plurality of vertical slits 154 dividing strip member 152 into a plurality of independently flexible fingers 155 (FIG. 16). The lower fillet contacting ends of these fingers may be bevelled as is indicated at 156, a feature found effective in loosening and removing skin from the fillet.

OPERATION OF THE DRESSING APPARATUS

The operation of the surface dressing apparatus 10 as set up to remove the skin and fins from fish fillet will be readily understood from the foregoing detailed description of its various components and auxiliaries and the following summary of its operation.

The apparatus is powered by the motor 12 driving conveyor 11 and by motor 14 driving a multitude of surface dressing mechanisms 20 and a separate motor driving the suction blower 30 functioning to remove skin and cuttings for transmission to a place of disposal. Fish fillets 100 are placed on the right hand end of conveyor 11 as shown in FIG. 1B for advance in succession past the surface groover auxiliary 23, the surface loosening auxiliary 25, and the fin removing auxiliary 26. Each of these auxiliaries is specially designed as described in detail above to perform an intended function to an extent greatly facilitating and expediting the final removal of a surface layer to the desired thickness while being conveyed past successive banks of the final dressing mechanisms 20 shown in FIG. 1A.

As has been explained above, dressing mechanisms 20 are arranged in six banks of three each, the banks being distributed lengthwise of the downstream end of conveyor 11. One or more dressing mechanisms 20' shown in FIG. 1A and 25-27 may also be employed along either side of the conveyor and utilized to dress strips of the surface layer from generally vertically disposed surfaces. Each mechanism 20 and 20' is adjusted and positioned to remove a designated narrow band of the surface layer by one or the other of the power driven dressing rollers 50 or 50'. Any dressing mechanism likely to encounter fins and associated bony structure is preferably equipped with toothed dressing roller 50' (FIGS. 6 and 11) whereas dressing mechanisms passing in contact with skin and few or no bony structures are equipped with rollers 50 having roughened or knurled dressing surfaces. As has been explained, each of the dressing mechanisms is carefully adjusted to have the surface of its dressing roller lying flush against the underlying surface of the fillet with the plane of the dressing roller lying normal to that fillet surface. The tension spring 89 (FIG. 2) is adjusted to maintain the roller bearing against the fillet surface under a desired pressure found effective to remove the associated surface layer. Cooperating with spring 89 is the counterweight 86 (FIG. 5) tending to maintain the plane of the dressing roller normal to the fish fillet.

As is best shown in FIG. 2, as a fillet 100 approaches any one of the dressing mechanisms 20, the latter is held in its normal position or rest adjacent the conveyor by spring 89. As the forward end of the fillet contacts the approach sensing shoe 81 of a dressing mechanism, the fillet presses against the underside of the shoe and automatically elevates or pivots the dressing mechanism about its axis 41 or 130. As the forward rim edge of the fillet advances past the forward end of the sensor the dressing roller is at the proper elevation and the broad forward end of the sensor has responded to the inclination of the underlying transverse end of the fillet to rotate the dressing roller about the pivot axis 99 (FIG. 5) so that the dressing roller lies in a plane normal to the associated underlying strip of the fillet to be dressed by that roller. The shoe continues to glide over the surface of the fillet and to cooperate with the glide shoes 70 alongside either face of the rollers in pivoting the dressing roller to the right or to the left about axis 99, as appropriate, to maintain the plane of the dressing roller normal to the particular portion of the strip then undergoing dressing. In this connection, it will be borne in mind that the counterweights 86 also cooperate with the glide shoes 70 in maintaining the dressing roller normal to the fillet and effective to dress a strip of uniform thickness despite the typically ever-changing contour of the fillet.

It will therefore be clear that the multiplicity of dressing rollers 50, 50', each adjusted and positioned to dress away a particular narrow band of the fillet or other object, cooperate in dressing the entire length and width of the fillet by the time the fillet has advanced past the last one of the dressing mechanisms. This is true irrespective of widely ranging and differing sizes and contour of the fillet undergoing dressing.

As dressing proceeds, the vacuum produced by the powerful suction fan 30 maintains a high velocity ample air flow through the air inlet ports 83 (FIG. 7) and past the teeth of the dressing rollers to carry away all cuttings rapidly and effectively. It will also be appreciated that the adjustable shoes 70, 70 closely adjacent each lateral side of the dressing rollers limit the depth of the dressed strip. The cuttings removed by the dressing rollers not infrequently tend to adhere to the dressing rollers and to interior surfaces of the tubular arms 37, tubing 33 and the suction manifold 28. This is avoided in a highly efficient and effective manner by regulating the supply of flushing fluid delivered in a spray from supply pipe 29 via spray ports 32a and 32b. These maintain the surfaces of the dressing rollers 50 and the interior surfaces of the suction passages wet. In consequence the rapidly flowing stream of suction air and fluid cooperate in preventing buildup of cuttings anywhere in the dressing mechanism and the cuttings removal passages.

A TYPICAL MODE OF UTILIZING THE DRESSING APPARATUS TO PROCESS FISH

In a typical mode of using the dressing apparatus 10 to process precooked whole fish, the auxiliaries 23, 15 and 26 shown in FIG. 1B can be either activated or deactivated. The right hand end of the conveyor is extended sufficiently to receive the cleaned fillets 100 from worker-manned processing tables conveniently located immediately adjacent and along the side of the conveyor. Precooked whole fish is placed on these processing tables, not shown, but of a type commonly used and well known to persons skilled in the fish processing art. At least one and preferably two groups of workers are conveniently stationed about these processing tables while manually manipulating the whole fish to separate the same into unskinned but clean fillets. Preferably, a first group snap off the head and the tail of each fish. The belly flap is cut away from the underside of the fish and the fish body is split into left and right halves in a plane passing through the backbone. The first continues by removing the backbone and associated bony structure, bloody streaks, if any, and the slime or gurry, all of which are collected and processed into secondary products such as fish meal and pet food.

The cleaned fillets are placed on conveyor 11 by the first group and advanced past the dressing mechanisms 20 which operate as described in detail above to remove the skin layer to a predetermined uniform depth. This operation is carried on rapidly and automatically in a highly efficient manner. The travel speed of the conveyor is adjusted by the variable speed drive motor 12 to a rate found most effective for the type of fish being dressed. The travel rate can vary widely but, by way of example, a rate of 65 feet per minute is found very satisfactory in dressing tuna and related types and sizes of fish.

While the foregoing is taking place a second group of workers proceeds to clean the detached belly flaps which are then routed to and joined with the fully dressed fillets resulting from the work of a third group of workers stationed at the exit end of the automatic dressing apparatus.

Dressed fillets exiting from the discharge end of conveyor 11 are routed on to a conveyor or dressing tables of any suitable construction manned by another group of workers who expeditiously remove any remaining traces of skin as well as blood meat unsuitable for packaging as select grade fish meat. These scrapings and ravellings of skin are retained for further processing into fish meal or pet food and the bloodmeat is separately but contemporaneously processed for other than prime grade fish meat.

Figure 8:
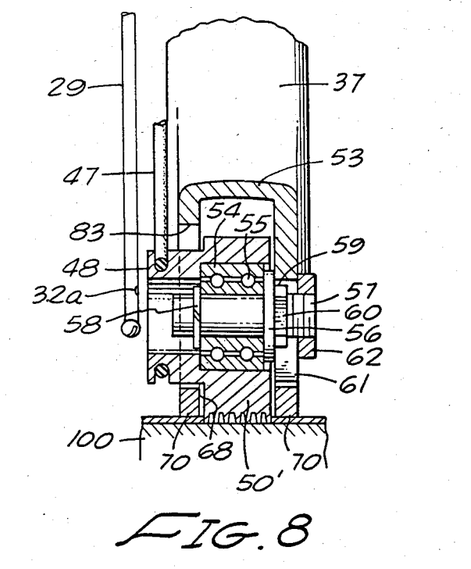
FIG. 8 is a fragmentary sectional view taken along line 8—8 on FIG. 7.
Figure 10:
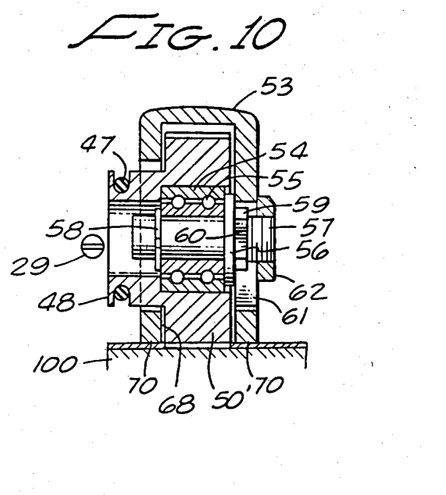
FIG. 10 is a cross sectional view taken along the broken line 10—10 on FIG. 5.
Figure 11:
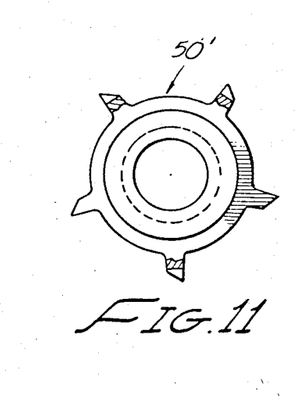
FIG. 11 is a cross elevational view of one of the dressing rollers with portions of certain teeth broken away to show details.
Figure 12:
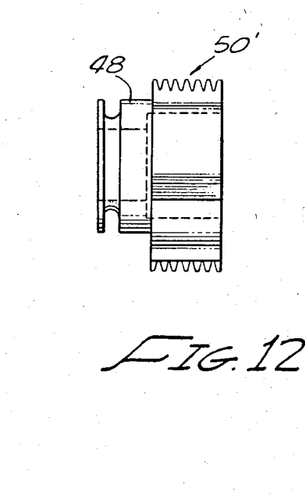
FIG. 12 is a transverse elevational view of the dressing roller shown in FIG. 11.

The finely comminuted surface layer removed by the dressing rollers is entrained in the suction air stream and into the liquid mixed therewith supplied from the nozzle 32a in the pipes 29 extending along the dressing arms 37 as shown, for example, in FIGS. 2, 3 and 8. This suction air and liquid stream is utilized to flush and carry away the cuttings generated by the dressing rollers and is found highly efficient in preventing these dressings and comminuted material from collecting anywhere in the suction air passages. These wet dressings are preferably processed in a suitable liquid and solids separator, such as a cyclone separator, and the very fine and comminuted cuttings are processed and packaged for commercial use as fish meal, pet food or the like.

While the particular automatic surface dressing machine herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Apparatus for removing a surface layer from an object of varying curvilinear contours including fish fillet comprising:
   power driven conveyor means for immovably supporting said object of varying contours while a surface area thereof is undergoing removal; and
   means floatingly biasing a power driven dressing roller having an axis lying in a plane extending transversely of said conveyor means into dressing contact with a strip of said object as said object advances therepast and which last mentioned means includes means permitting said dressing roller to pivot about an axis extending longitudinally of said conveyor means and tangent to said roller at its line of contact with the object.

2. Apparatus as defined in claim 1 characterized in the provision of means positioned closely beside said dressing roller adjacent the area thereof positioned to dress said object and operable to limit the depth of the material dressed from said object.

3. Apparatus as defined in claim 2 characterized in that said means for limiting the depth of dressed material comprises movably supported shoe means located closely beside a respective lateral end of said dressing roller.

4. Apparatus as defined in claim 3 characterized in the provision of manually adjustable means for adjusting the position of said shoe means radially of said dressing roller and generally normal to the juxtaposed surface of said object undergoing dressing.

5. Apparatus as defined in claim 1 characterized in the provision of shroud means embracing the major portion of said dressing roller and adapted to be connected to a source of suction, and said shroud means including air inlet means for admitting atmospheric air in areas effective to entrain cuttings from said object produced by said dressing roller.

6. Apparatus as defined in claim 1 characterized in that said means for floatingly supporting said dressing roller includes a tubular arm having said dressing roller journalled crosswise of one end thereof, means for pivotally supporting the other end of said arm for limited pivotal movement about an axis extending transversely of said conveyor means and for permitting said dressing roller to pivot through a limited arc about an axis tangent to said dressing roller at its line of dressing contact with the object undergoing dressing.

7. Apparatus as defined in claim 6 characterized in that said tubular arm is in communication with a source of suction effective to entrain cuttings produced by said dressing roller.

8. Apparatus as defined in claim 6 characterized in that said other end of said tubular arm includes counterweight means effective to bias said dressing roller to pivot away from the object undergoing dressing, and means for varying the effectiveness of said counterweight means so that said dressing roller is biased into contact with said object under a predetermined pressure adequate to dress away a surface strip from said object.

9. Apparatus as defined in claim 8 characterized in that said adjustable counterweight biasing means comprises manually adjustable spring means.

10. Apparatus as defined in claim 8 characterized in that said counterweight means includes manually adjustable means for positioning said counterweight means to restrict pivotal movement of said tubular arm to a limited arc about the longitudinal axis of said other end thereof and thereby effective to maintain the transverse surface of said dressing roller substantially parallel to the underlying surface of the object undergoing dressing.

11. Apparatus as defined in claim 8 characterized in that said counterweight means is normally effective to maintain said dressing roller in a preselected neutral position with the plane thereof substantially normal to the juxtaposed area of the object undergoing dressing but permitting said dressing roller to pivot in a limited arc in either direction from said preselected position in response to changes in the contour of the object undergoing dressing transversely of the path of travel thereof past said dressing roller.

12. Apparatus as defined in claim 10 characterized in the provision of elevating means attached to said floatingly supported dressing roller positioned in the path of an object approaching said dressing roller and operable to elevate said dressing roller to the appropriate position to initiate dressing said object and to pivot said dressing roller about said longitudinal axis of said other end of said tubular arm until the surface of said dressing roller lies parallel to the underlying surface of the object undergoing dressing.

13. Apparatus as defined in claim 6 characterized in that said means for permitting limited pivotal movement of said tubular arm about an axis tangent to the line of contact of said dressing roller with the object undergoing dressing includes manually adjustable means for clamping said counterweight means in different positions about said axis of said tubular arm.

14. Apparatus as defined in claim 13 characterized in the provision of shoe means closely beside the opposite sides of said dressing roller positioned to rest against the surface of the object undergoing dressing with the periphery of said dressing roller protruding radially outwardly from the support surface of said shoe means thereby to limit the depth of the material dressed from said object and cooperating with said counterweighted pivot means for said dressing roller to maintain the thickness of the strip dressed from said object substantially uniform crosswise of said strip.

15. Apparatus as defined in claim 1 characterized in that said means for floatingly supporting said dressing roller means includes a tubular arm, and shouldered bolt means providing a supporting shaft for said dressing roller and provided with nut means at one end thereof operable to clamp said dressing roller detachably mounted transversely of one end of said tubular arm.

16. Apparatus as defined in claim 15 characterized in the provision of plastic antifriction bearing means between said dressing roller and said supporting shaft therefor.

17. Apparatus as defined in claim 6 characterized in the provision of belt means for driving said dressing roller and including a first belt pulley mounted coaxially of said dressing roller and a pair of pulleys coaxially of said horizontal pivot axis for said other end of said tubular arm, a belt mounted between said first pulley and one of said pair of pulleys, and a power driven belt mounted on the other one of said pair of pulleys.

18. Apparatus for dressing a surface layer from fish fillet of varying curvilinear contours comprising:
power driven conveyor means for supporting and advancing a longitudinal row of fish fillet of varying contours in succession past a dressing station;
means floatingly supporting a multiplicity of power driven dressing rollers distributed crosswise and lengthwise of said conveyor means at said dressing station each of which dressing rollers is positioned and effective to remove a respective strip from the surface of said fish fillet as the same are conveyed past said dressing rollers; and
said floating support means for said dressing rollers including means for pivoting said dressing rollers individually about an axis tangent to the line of contact of a respective one of said dressing rollers with the juxtaposed surface of the fish fillet undergoing dressing.

19. Apparatus as defined in claim 18 characterized in that said means for floatingly supporting said dressing rollers includes separate floating support means for each of said dressing rollers and including independent manually adjustable means for biasing each of said dressing rollers into contact with said fish fillet undergoing dressing at a pressure of predetermined value adequate to maintain the associated one of said dressing rollers in effective dressing contact with said fish fillet of varying contours and varying surface height thereof above said conveyor means.

20. Apparatus as defined in claim 18 characterized in that said means floatingly supporting said dressing rollers includes respective elongated arms each pivotally mounted on an axis lying in a generally upright plane extending transversely of said conveyor means.

21. Apparatus as defined in claim 20 characterized in that said means floatingly supporting said dressing rollers includes a plurality of separate pivot shaft means each pivotally supporting a plurality of said elongated arms for limited pivotal movement in a vertical plane thereby to support said dressing rollers at varying distances from said conveyor means.

22. Apparatus as defined in claim 18 characterized in the provision of adjustable stop means for supporting individual ones of said dressing rollers free of contact with said conveyor means when an object to be dressed is not in contact with an individual dressing roller.

23. Apparatus as defined in claim 18 characterized in the provision of a power source connected by means including a plurality of belts to each of said dressing rollers.

24. Apparatus as defined in claim 18 characterized in the provision of power driven suction air means in communication with separate ported shroud means for each of said dressing rollers operable to admit fast flowing air therepast effective to entrain and carry away cuttings from said dressing rollers.

25. Apparatus as defined in claim 18 characterized in the provision of support shoe means positioned closely beside a respective end of said dressing rollers and the support surface of each being spaced radially inwardly from the periphery of said dressing rollers by the desired thickness of the surface layer to be dressed from said fish fillet, and said support shoe means being effective to pivot each of said dressing rollers about the associated one of said axes tangent to the respective lines of contact of said dressing rollers with the fish fillet being dressed.

26. Apparatus as defined in claim 18 characterized in the provision of means extending crosswise of said conveyor upstream from said dressing station and including a multiplicity of independently and movably supported means effective to form spaced apart grooves in the surface of fish fillet on said conveyor en route to said dressing station.

27. Apparatus as defined in claim 26 characterized in that said surface grooving means each include a plurality of sharp tipped elements pivotally supported for limited movement toward and away from said conveyor means and at least one elongated resilient scraper strip supported between adjacent ones of said sharp tipped elements with the transverse end thereof terminating closely adjacent the ends of said sharp tipped grooving elements and effective to scrape and loosen surface material of said fish fillet located between the grooves therein formed by said sharp tipped elements.

28. Apparatus as defined in claim 18 characterized in the provision of a plurality of scraper means pivotally mounted on support means extending crosswise of said conveyor means in a location upstream from said dressing station, said scraper means each including a plurality of elongated resilient strips lying in a generally upright position with the lower free ends thereof positioned to scrape, loosen and dislodge material from the surface of fish fillet conveyed therepast.

29. Apparatus as defined in claim 28 characterized in that each of said scraper means has limtied freedom to pivot in either direction relative to a generally upright plane extending transversely of said conveyor means and including resilient means biasing said scraper strips to a neutral position lying in a plane transversely of said conveyor means.

30. Apparatus as defined in claim 18 characterized in the provision of power driven rotary means mounted on a shaft extending transversely of said conveyor means upstream from said dressing station and useful in weakening and dislodging fin structure from fish fillet supported on said conveyor means as the same advance toward said dressing station, said rotary means including rotary hub means supporting a plurality of flexible generally radially disposed arms having an uneven surface positioned for contact with fin structure of a fillet advancing therepast toward said dressing station.

31. That method of dressing fish fillets which comprises:
advancing a row of fillets sequentially past successive power driven dressing roller means having the axes thereof extending horizontally transversely of the path of advance of said fillets and each positioned to dress a respective different longitudinal strip of the surface layer of said fillets as said fillets advance past said dressing roller means while maintaining said dressing roller means under generally uniform pressure contact with said fillets;
mounting said dressing roller means for limited pivotal movement in opposite directions about an axis extending lengthwise of the advance of said fillets past said dressing station and closely adjacent the surface undergoing dressing by the associated one of said dressing roller means; and
utilizing the pressurized contact of said dressing roller means with said fish fillets to pivot said roller means in a direction to remove a strip of substantially uniform thickness from said fillets.

32. That method of dressing fish fillets as defined in claim 31 characterized in the steps of passing a confined stream of air past said dressing roller means thereby entraining and carrying away particles of the surface layer removed from said fillets by said dressing rollers.

33. That method of dressing fish fillets as defined in claim 31 characterized in the step of equipping said dressing roller means with shoe means positioned to contact the surface of said fillets closely adjacent the surface of fillets undergoing dressing and effective to pivot said dressing wheel means in either direction transversely thereof and thereby effective to provide for dressing away a strip of substantially uniform transverse thickness.

34. That method of dressing fish fillets as defined in claim 31 characterized in the steps of individually biasing said dressing roller means into pressure contact with said fillets under a predetermined pressure effective to maintain the same in effective dressing contact with said fillets.

35. That method of dressing fish fillets as defined in claim 34 characterized in the step of mounting said dressing roller means for limited vertical movement to accommodate changes in the vertical thickness of different longitudinal portions of said fillets without restricting the freedoms of said dressing roller means to pivot freely in either direction.

36. That method of dressing fish fillets as defined in claim 31 characterized in the step of normally supporting said dressing roller means at a predetermined minimum height adjacent but above the lower surface of said row of fillets, and providing each of said dressing roller means with a sensor closely upstream therefrom positioned to sense the thickness of the advance end of a fillet and to elevate said dressing roller means by the proper distance to initiate dressing a surface layer strip from the fillets.

37. Apparatus as defined in claim 7 characterized in the provision of means for delivering a fluid onto said dressing roller and into said suction air entraining cuttings therefrom.

38. Apparatus as defined in claim 25 characterized in the provision of means for delivering a liquid into said fast flowing stream of air passing over said dressing rollers to moisten the cuttings produced by said rollers and to facilitate the rapid removal thereof by said suction air means.

39. That method of dressing fish fillets defined in claim 32 characterized in the step of spraying liquid into said stream of air flowing past said dressing roller means thereby to facilitate the entrainment of cuttings into said stream of air and to expedite the removal of cuttings produced by said dressing roller means.

40. A method of processing a whole precooked fish comprising:
manually snapping off the head and tail portions of the precooked fish;
manually cutting off the belly flap and separating the fish body into a pair of unskinned fillets free of backbone structure; and
advancing the skin side of said fillets sequentially past successive movably-supported, power-driven, rotary dressing rollers each positioned to dress a respective different strip of substantially uniform thickness from the skin side of said fillets while automatically biasing each of said dressing rollers into contact with said fillets and pivoting the plane of said dressing rollers about an axis parallel to the path of travel of said fillets therepast which axis is located between the opposite ends of said dressing rollers.

41. The method of processing precooked fish as defined in claim 40 characterized in the step of utilizing the portions removed therefrom into at least one commercially useful product.

42. The method of processing precooked fish as defined in claim 40 characterized in the steps of utilizing at least a first group of workers to snap off the head and tail, cut off the belly flap and to separate the fish body into a pair of clear unskinned fillets free of gurry and ready for the removal of skin therefrom by said power-driven dressing rollers.

43. The method of processing precooked fish as defined in claim 42 characterized in the step of utilizing said first group of workers to place said cleaned fillets skin-side up on means for advancing said fillets past said dressing rollers.

44. The method of processing precooked fish as defined in claim 42 characterized in the step of utilizing a second group of workers to clean and process only said belly flaps for packaging along with other prime grade fish meat.

45. The method of processing precooked fish as defined in claim 42 characterized in the step of utilizing a third group of workers to detach bloodmeat and the remains of skin fragments from said fillets after the passage of said fillets beyond said dressing rollers.

46. The method of processing precooked fish as defined in claim 44 and 45 characterized in carrying out all of said steps generally simultaneously.

47. The method of processing precooked fish as defined in claim 40 characterized in the step of utilizing a stream of subatmospheric air flowing past said dressing rollers to carry away material dressed therefrom.

48. The method of processing precooked fish as defined in claim 47 characterized in the step of introducing a liquid into said stream of air flowing past said dressing rollers to facilitate and expedite the removal of said cuttings as the same are formed.

49. The method of processing precooked fish as defined in claim 48 characterized in the step of collecting the material dressed from said fillets by said dressing rollers and carried away therefrom in said air stream, separating said added liquid from said material, and processing said material for commercial use.

50. The method of processing precooked fish as defined in claim 40 characterized in the step of providing each of said dressing rollers with individual readily accessible manual means for separately adjusting the thickness of the layer dressed thereby from said fillets and with readily accessible manual means for separately adjusting the biasing of said dressing rollers against said fillets.

* * * * *